United States Patent
Filimonova et al.

(10) Patent No.: US 8,290,272 B2
(45) Date of Patent: Oct. 16, 2012

(54) CREATING A DOCUMENT TEMPLATE FOR CAPTURING DATA FROM A DOCUMENT IMAGE AND CAPTURING DATA FROM A DOCUMENT IMAGE

(75) Inventors: Irina Filimonova, Moscow (RU); Sergey Zlobin, Moskovskaya (RU)

(73) Assignee: ABBYY Software Ltd., Nicosia (CY)

( * ) Notice: Subject to any disclaimer, the term of this patent is extended or adjusted under 35 U.S.C. 154(b) by 1073 days.

(21) Appl. No.: 12/206,067

(22) Filed: Sep. 8, 2008

(65) Prior Publication Data

US 2009/0074296 A1   Mar. 19, 2009

Related U.S. Application Data

(60) Provisional application No. 60/972,703, filed on Sep. 14, 2007.

(51) Int. Cl.
*G06K 9/48* (2006.01)
*G06K 9/36* (2006.01)

(52) U.S. Cl. .................. 382/181; 382/276; 715/200

(58) Field of Classification Search .......... 382/100–325
See application file for complete search history.

(56) References Cited

U.S. PATENT DOCUMENTS

| | | | | |
|---|---|---|---|---|
| 4,996,665 A * | 2/1991 | Nomura | ........... | 1/1 |
| 5,197,121 A * | 3/1993 | Miyoshi et al. | ........... | 715/201 |
| 5,317,646 A | 5/1994 | Sang, Jr. et al. | | |
| 5,339,412 A | 8/1994 | Fueki | | |
| 5,422,743 A * | 6/1995 | Farrell et al. | ........... | 358/537 |
| 5,428,694 A | 6/1995 | Betts et al. | | |
| 5,434,962 A | 7/1995 | Kyojima et al. | | |
| 5,459,827 A * | 10/1995 | Allouche et al. | ........... | 715/204 |
| 5,555,101 A | 9/1996 | Larson et al. | | |
| 5,555,362 A * | 9/1996 | Yamashita et al. | ........... | 715/209 |
| 5,633,996 A * | 5/1997 | Hayashi et al. | ........... | 715/246 |
| 5,701,500 A * | 12/1997 | Ikeo et al. | ........... | 715/209 |
| 5,727,220 A * | 3/1998 | Hohensee et al. | ........... | 715/234 |
| 5,822,454 A | 10/1998 | Rangarajan | | |
| 5,848,184 A * | 12/1998 | Taylor et al. | ........... | 382/173 |
| 5,848,186 A * | 12/1998 | Wang et al. | ........... | 382/176 |
| 5,999,664 A * | 12/1999 | Mahoney et al. | ........... | 382/305 |
| 6,002,798 A * | 12/1999 | Palmer et al. | ........... | 382/176 |
| 6,400,845 B1 | 6/2002 | Volino | | |
| 6,456,738 B1 * | 9/2002 | Tsukasa | ........... | 382/175 |
| 6,562,077 B2 * | 5/2003 | Bobrow et al. | ........... | 715/204 |
| 6,941,521 B2 * | 9/2005 | Lin et al. | ........... | 715/762 |
| 7,028,250 B2 * | 4/2006 | Ukrainczyk et al. | ........... | 715/202 |
| 7,069,501 B2 * | 6/2006 | Kunitake et al. | ........... | 715/234 |
| 7,149,347 B1 | 12/2006 | Wnek | | |
| 7,171,615 B2 | 1/2007 | Jensen et al. | | |

(Continued)

FOREIGN PATENT DOCUMENTS

JP     11224346 A  *  8/1999

(Continued)

*Primary Examiner* — Manav Seth

(74) *Attorney, Agent, or Firm* — John C. Meline; LeighAnn Weiland

(57) ABSTRACT

In one embodiment, there is disclosed a method capturing data from a document image. The method 300 comprises processing the document image to identify at least one repetitive structure and performing a capturing operation including creating a plurality of instances of the repetitive structure based on once-described structure properties of the repetitive structure in a document template, and populating each instance with corresponding data from the document image. The method may also include creating a document template for capturing data from a document image.

24 Claims, 4 Drawing Sheets

U.S. PATENT DOCUMENTS

| | | | |
|---|---|---|---|
| 7,310,635 B2 | 12/2007 | Tucker | |
| 7,346,215 B2 | 3/2008 | Shih et al. | |
| 7,383,496 B2 * | 6/2008 | Fukuda | 715/230 |
| 7,529,408 B2 | 5/2009 | Vohariwatt et al. | |
| 7,653,921 B2 * | 1/2010 | Herley | 725/19 |
| 7,761,787 B2 * | 7/2010 | Singleton et al. | 715/243 |
| 8,056,001 B2 * | 11/2011 | Chao | 715/243 |
| 8,064,096 B2 * | 11/2011 | Waara | 358/1.5 |
| 2002/0029232 A1 * | 3/2002 | Bobrow et al. | 707/517 |
| 2002/0064316 A1 * | 5/2002 | Takaoka | 382/305 |
| 2004/0153465 A1 * | 8/2004 | Singleton et al. | 707/100 |
| 2005/0067482 A1 | 3/2005 | Wu et al. | |
| 2007/0133067 A1 * | 6/2007 | Garg | 358/462 |
| 2007/0168382 A1 | 7/2007 | Tillberg et al. | |
| 2008/0170786 A1 * | 7/2008 | Tomizawa et al. | 382/176 |
| 2008/0195968 A1 | 8/2008 | Schacht | |
| 2009/0028437 A1 | 1/2009 | Hirohata | |
| 2009/0074296 A1 | 3/2009 | Filimonova et al. | |
| 2009/0216794 A1 * | 8/2009 | Saptharishi | 707/102 |

FOREIGN PATENT DOCUMENTS

JP     2004355528 A  *  12/2004

* cited by examiner

100

| | KINDLY REQUEST TO OPEN (CHECK ONLY ONE) | | |
|---|---|---|---|
| ☐ 104.1 | ☐ SETTLEMENT ACCOUNT   ☐ CALL DEPOSIT ACCOUNT  104.2<br>☐ CARD ACCOUNT   ☐ "ZETA BANK" ACCOUNT | IN THE CURRENCY (ENTER CURRENCY CODE): | ☐ 104.3 |
| ☑ | ☑ SETTLEMENT ACCOUNT   ☐ CALL DEPOSIT ACCOUNT<br>☐ CARD ACCOUNT   ☐ "ZETA BANK" ACCOUNT | IN THE CURRENCY (ENTER CURRENCY CODE): | USD |
| ☑ | ☑ SETTLEMENT ACCOUNT   ☑ CALL DEPOSIT ACCOUNT<br>☐ CARD ACCOUNT   ☐ "ZETA BANK" ACCOUNT | IN THE CURRENCY (ENTER CURRENCY CODE): | |
| ☐ | ☐ SETTLEMENT ACCOUNT   ☐ CALL DEPOSIT ACCOUNT<br>☐ CARD ACCOUNT   ☐ "ZETA BANK" ACCOUNT | IN THE CURRENCY (ENTER CURRENCY CODE): | |

*FIG. 1*

400
*FIG. 4*

CREATING A DOCUMENT TEMPLATE FOR CAPTURING DATA FROM A DOCUMENT IMAGE AND CAPTURING DATA FROM A DOCUMENT IMAGE

This application claims the benefit of priority to U.S. Provisional Patent 60/972,703 filed Sep. 14, 2007 and which is hereby incorporated by reference.

FIELD

Embodiments of the present invention are directed towards implementation of a method of (and system for) creating a document template for capturing data from a document image, and a method of (and system for) capturing data from a document image.

BACKGROUND

Data capture systems are used to extract data from paper documents or from images created from such documents. A typical data capture system consists of an imaging device that acquires the image of the document and software that runs on a computer that processes the acquired image. To process structures (e.g. data field areas) in the image, such software should be provided with information about such fields. The information may include the position of the fields in relation to page boundaries or other objects, properties of the data, validation rules, etc. For the sake of simplicity, the information is hereinafter referred to as a "document template." Document templates are provided for a specific document type, or for a set of document types which the data capture system is expected to handle.

After the document template is created, it is used by the data capture software to process documents.

Documents may contain repetitive structures (e.g. repetitive fields or groups of fields). For instance, a series of similar structures may exist for each child of a family, or for each house on the same street, etc.

SUMMARY OF INVENTION

In one embodiment, there is disclosed a method of (and system for) capturing data from a document image. The method comprises processing the document image to identify at least one repetitive structure and performing a capturing operation including creating a plurality of instances of the repetitive structure based on once-described structure properties of the repetitive structure in a document template, and populating each instance with corresponding data from the document image.

There is also disclosed a method of (and system for) creating a document template for capturing data from a document image. The method comprises identifying at least one repetitive structure to be encountered in the document image from which data is to be captured and storing structure properties to process the repetitive structure in the document image, wherein the structure properties are described once in the document template, regardless of a number of occurrences of the repetitive structure in the document image.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 1 shows an example of a document with repetitive structures.

FIG. 4 shows a schematic view of once-defined structure properties, in accordance with one embodiment of the invention.

DETAILED DESCRIPTION

Figure 2:
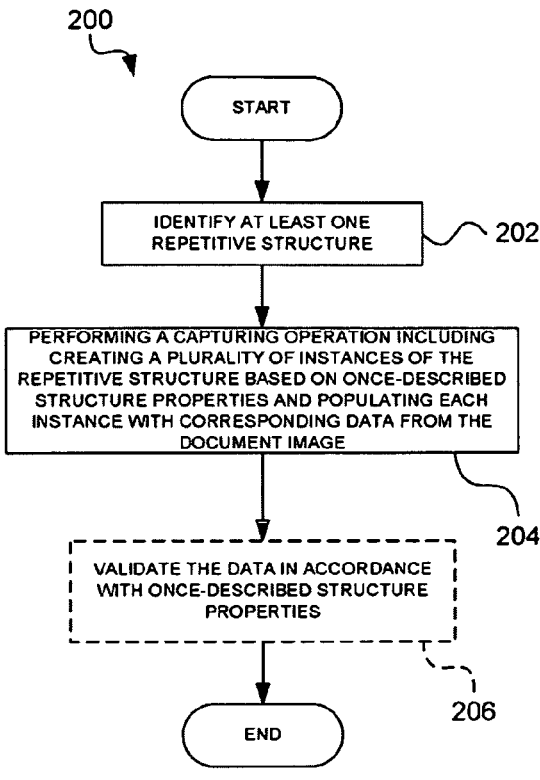
FIG. 2 shows a flowchart of a method of creating a document template for capturing data from a document image, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention disclose a method of capturing data from a document image and a method for creating a document template for capturing data from a document image, and related systems. The document, from which the document image is acquired (e.g. scanned), includes a plurality of repetitive structures. By repetitive is meant that similar or identical structures are encountered in the document (and hence document image) at least twice. The term "repetitive structure" or simply "structure" includes a field and a group of fields. In one embodiment, the system for capturing data from a document image comprises an imaging device connected to a computer with a specially designed data capture software application based on OCR/ICR. The setup of the data capture application is configured so that when a paper document is scanned, and a document image is produced which contains a plurality of repetitive structures, then the data capture application will selectively handle the data in each of the repetitive structures and will apply the same once-described structure properties, optionally including validation, verification, and export procedures, to each instance of such data in their respective repetitive structures.

In general, document processing involves, on the one hand, a template design stage, during which a document template is designed to facilitate document processing, and, on the other hand, a document processing stage in which data is extracted from a document image using the document template.

FIG. 1 shows an example of a document 100 having a plurality of repetitive structures. In this example, each repetitive structure is in the form of a group of fields 102. Additionally, some of the fields 104.2 within the group 102 are also repetitive, thus also constituting a repetitive structure. The document 100 has four groups of fields 102, but the number of groups may vary from document to document. In this example, each group includes six fields 104 into which data may be entered, although it is to be appreciated that the number of fields 104 in a group 102 may vary from document to document. Also, the fields need not necessarily be grouped into groups. Data may be hand-printed by pen, machine-printed by a printer, or the like.

In the example document 100, each repetitive group 102 comprises five checkbox fields 104.1, 104.2 and one text entry field 104.3. One of the checkbox fields 104.1 may be used to indicate that data has been entered in a particular group 102 (e.g. whether that particular group 102 is activated or deactivated), while the remaining four checkbox feels 104.2 are entitled respectively "Settlement Account", "Call Deposit Account", "Card Account", and "ZETA Bank Account".

"Structure properties" include rules for processing data expected to be entered into a particular type of structure. Structure properties may include validation, verification, and export procedures to be followed when capturing data from a repetitive structure in the document image. Structure properties may also include an indication of whether a particular field within a repetitive structure is optional, an indication of whether a particular repetitive structure spans multiple pages in the image document, and the like.

Regardless of the exact nature of the structure properties, a method in accordance with an example embodiment comprises processing the document image to identify a plurality of repetitive structures and performing a capturing operation including creating a plurality of instances of the repetitive structure based on once-described structure properties of the repetitive structure in a document template, and populating each instance with corresponding data from the document image. An advantage of this may be that, because the structure properties are once-described, they can be applied uniformly to each repetitive structure, regardless of the number of repetitive structures. In fact, the exact number need not even be known in advance. Further, when creating a document template, it is not necessary to describe or define structure properties multiple times in order to apply the structure properties to multiple repetitive structures (further described below).

Structure properties, of repetitive structures in a document, may further be used once, in accordance with an example embodiment, to describe:

- a single field or a group of fields that repeat themselves two or more times across the document;
- a column title of a multi-page table, if these column titles repetitively occur on at least two pages;
- a particular row of a table if, this row has a complex structure. For example, a row may contain merged cells or may be located on more than one line (this is typical of wide tables where all columns do not fit on one line and are carried over to the next line); and
- repetitive tables in which data creeps over to the next page(s) mid-table.

Each structure may have a plurality of structure properties associated therewith. The particular structure properties will depend on the nature of the structure. Repetitive structures will have the same once-described structure properties associated therewith, in accordance with an example embodiment.

Structure properties may further include, among other things, the following:

- type of data inside the structure, such as "date," "time," "name," "surname," "city name," "phone number," "address," etc;
- rules that connect the contents of the structure to the contents of other structures or any other available data;
- structure type, such as "checkmark," "text field," "barcode field," etc; and
- structure processing settings, such as recognition parameters, information about the layout of the structure, etc.

Figure 3:
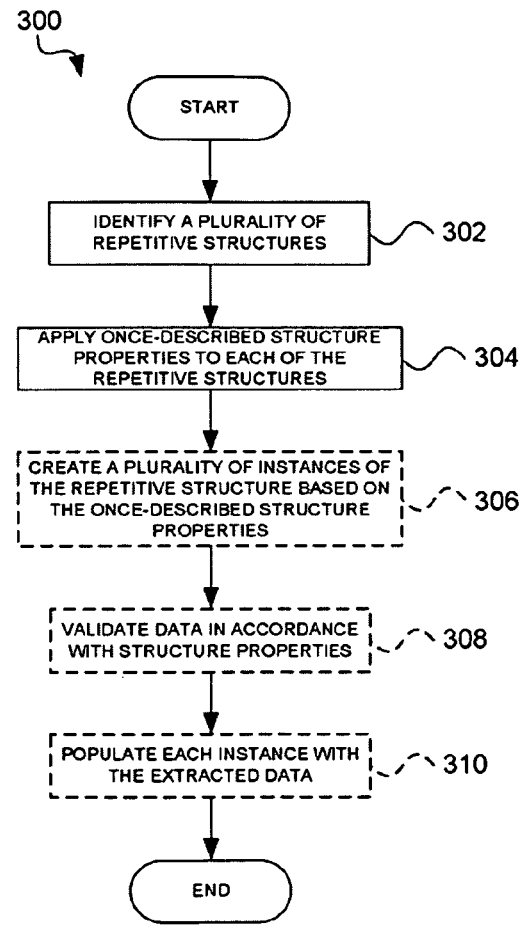
FIG. 3 shows a flowchart of a method of capturing data from a document image using the document template created in accordance with the method of FIG. 2.

An example embodiment will now be further described, in use, with reference to FIGS. 2 and 3 and to Table 1.

Referring first to FIG. 2, reference numeral 200 generally indicates a flow diagram of a method for creating a document template for capturing data from a document image, in accordance with an example embodiment. The method 200 is intended to improve the efficiency of creating a document template for a document having repetitive fields. For ease of description, the method 200 is further described with respect to the document 100, although it is to be appreciated that the method 200 may be applied to other documents. The method 200 includes identifying, at block 202, at least one repetitive structure (e.g. the group of fields 102 or the fields 104.2 within the group 102) to be encountered in the document image (e.g. acquired from the document 100) from which data is to be captured.

The method 200 may then include performing, at block 204, a capturing operation including creating a plurality of instances of the repetitive structure based on once-described structure properties of the repetitive structure in a document template, and populating each instance with corresponding data from the document image.

Table 1 shows a schematic representation of an example of a plurality of structure properties. It will be noted from Table 1 that structure properties may include rules or definitions for handling data expected to be inputted in the repetitive structures 102, 104.2.

Optionally, the method 200 may comprise, when performing the capturing operation (at block 204), validating, at block 206, the data for each instance of the repetitive structure 102, 104.2 in accordance with the once-described structure properties (Table 1). The method 200 may comprise receiving a user input (for example via a user interface comprising an input device) indicative of the structure properties. In an alternative example embodiment, the structure properties may be determined or generated automatically, or there may be at least some degree of automation. Receiving the user input may include prompting the user to input, for example, validation and verification rules, export procedures, attributes of the structure, and so forth.

Optionally, the method 200 may include storing placement data for one or more of the repetitive structures 102, 104.2. Instead, the placement data may be generated automatically when acquiring the document image 100. In this example, and with reference to document 100, the placement data may indicate that there are four repetitive structures 102, one above the other, each separated by a solid horizontal line.

By way of development, it should be appreciated that there could be a repetitive structure nested within another repetitive structure. In the document 100, checkboxes 104.2 within a particular group 102 are repetitive fields and can therefore be classified as repetitive structures. Further, the groups 102 are repetitive groups and can also be classified as repetitive structures. Therefore, it may be required to enter or describe the properties of a checkbox 104.2 only once and the properties can automatically be applied to all of the checkboxes 104.2. Similarly, it may be required to enter or describe the properties of a group 102 only once. In this fashion, the properties of a particular repetitive structure are described or entered only once, regardless of the number of expected occurrences of that repetitive structure.

Referring now to FIG. 3, reference numeral 300 generally indicates a method of capturing data from a document image. For ease of description, the method 300 is described with reference to the document 100 and the once-described structure properties of Table 1.

The method 300 comprises processing the document image 100 to identify a plurality of repetitive structures (the groups 102 and the checkboxes 104.2). Next, data may be extracted, at block 304, from each of the repetitive structures 102, 104.2 by applying the once-described structure properties (Table 1) to each of the repetitive structures 102, 104.2.

Extracting the data may include creating, at block 306, a plurality of instances of the repetitive structure, one instance for each of the repetitive structures 102, 104.2 in the document image 100, based on the once-described structure properties (Table 1). Each instance may then be populated, at block 310, with the extracted data from the corresponding repetitive structure 102, 104.2 in the document image 100. Optionally, the method 300 may include validating, at block 308, the extracted data in accordance with the once-described structure properties (Table 1).

By way of a more specific example, the group 102.2 is a repetitive structure having data entered therein. Each field 104 of the group 102.2 is processed in accordance with the structure properties (Table 1). The checkbox 104.1 is checked, and therefore the remaining fields 104.2, 104.3 are to be processed. Only one checkbox 104.2 of the repetitive group of checkboxes 104.2 is checked and thus no exception is raised. The text entered in field 104.3 is validated against a list of pre-defined currency codes and is found to be valid. The data in the group 102.2 is thus found to be valid, in accordance with the structure properties (Table 1), and is processed and optionally exported as desired. Turning now to the group 102.3, data has also been entered into this repetitive structure. As the check box 104.1 is checked, the remaining fields 104.2, 104.3 are to be processed. However, two of the checkboxes 104.2 have been checked. This violates the validation rules and an exception is therefore raised. Further, the field 102.3 is indicated as compulsory but has been left blank, causing a further exception to be raised.

The process is repeated and multiple instances of the repetitive structure may be created or spawned, each having stored therein the associated extracted data. Thus, multiple structures can be processed be re-using once-defined structure properties.

FIG. 4 of the drawings shows an alternative example schematic view of the once-described structure properties 400.

In general, in the case of a multi-page document, a particular repetitive structure may creep over from one page to the next, e.g. different fields within a group may be placed on different document pages. Also, any field (and any number of fields) within a repetitive group may be optional, e.g. they may be present within one group, but not within another group.

In some cases, repetitive groups may occur in a document in any order: left to right, top to bottom, bottom to top, or right to left. Moreover, the exact order may not be specified at all. Also, rectangles enclosing different repetitive group instances may intersect. However, individual fields within different repetitive group should preferably not intersect.

In some cases, repetitive groups may contain an arbitrary number of fields. In such cases, another repetitive group may be used as a separator. When such separating repetitive group is found, it is considered as a boundary for the abovementioned repetitive group with arbitrary number of fields. The nesting of repetitive groups is not necessarily limited in any way, because in the case of nested groups, a search is done from the innermost group towards outermost, and in each stage the same search approach can be used to find a repetitive group as for the case of plain, non-nested groups.

Embodiments of the present invention also cover a corresponding system for capturing data from a document image and a system for creating a document template for capturing data from a document image.

Figure 5:
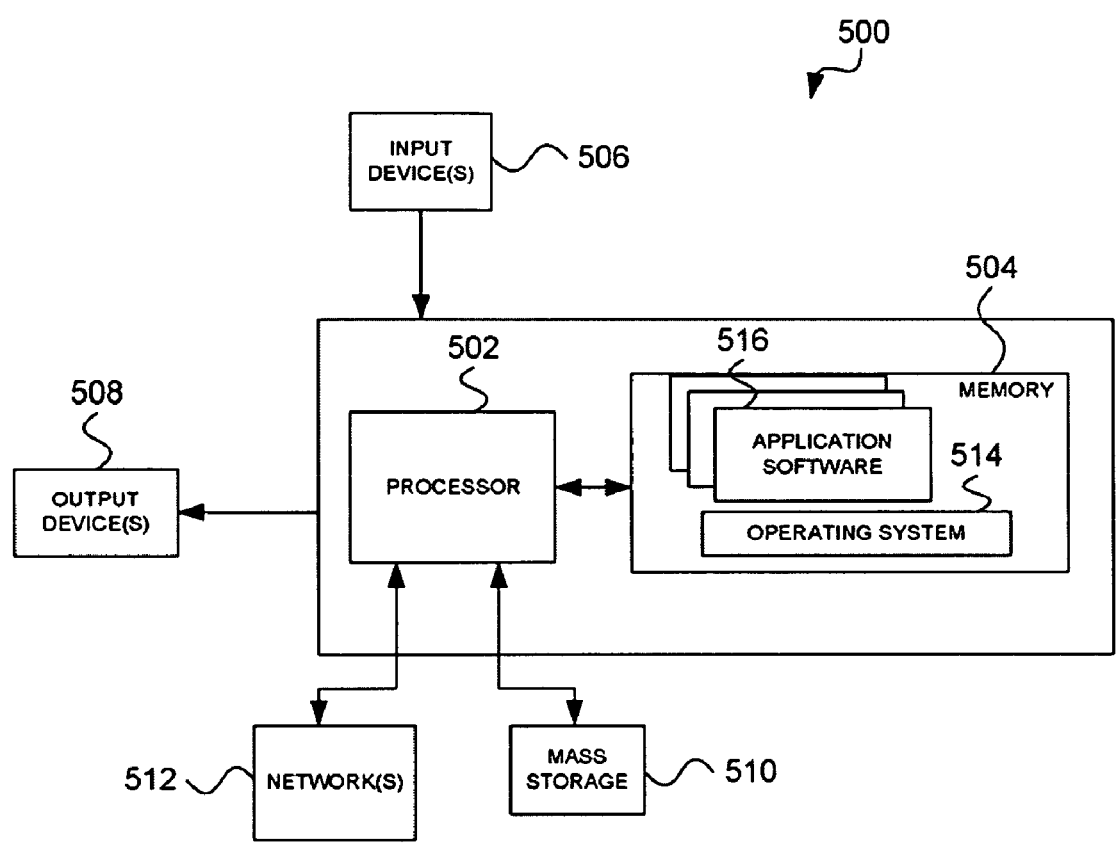
FIG. 5 shows a block diagram of a system for creating a document template and for data capture, in accordance with one embodiment of the invention.

FIG. 5 of the drawings shows an example of a system 500. Depending on the use of the system 500, it may be a system for creating a document template, for example for implementing the method 200, in accordance with an embodiment, or it may be a system for data capture, for example used for implementing the method 300, in accordance with an embodiment. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also may receive a number of inputs and outputs for communicating information externally. For interface with a user or operator, the system 500 may include one or more user input devices 506 (e.g., a keyboard, a mouse, imaging device, etc.) and one or more output devices 508 (e.g., a Liquid Crystal Display (LCD) panel, a sound playback device (speaker, etc)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 may include suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512, e.g. in a distributed computing environment, whereby the processing required to implement the functions of a computer program may be allocated to multiple computers over a network. The application software 516 may include a set of instructions which, when executed by the processor 502, causes the system 500 to implement the method 200 or the method 300.

In general, the routines executed to implement the embodiments of the invention may be implemented as part of an operating system or a specific application, component, program, object, module or sequence of instructions referred to as "computer programs." The computer programs may comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

TABLE 1

Example of structure properties

| Description | Properties |
| --- | --- |
| Type of structure | Group of fields (102) |
| Variable or fixed no. of fields in group | Fixed |
| No. of fields in group | 6 |
| Group optional | Yes |
| Span pages | No |
| Location | Determine automatically |
| Field #1 (104.1): Type of structure | Checkbox |
| Field #1: Optional | Yes |
| Field #1: Span pages | No |
| Field #1: Location | Leftmost field in group |
| Field #1: Validation rules | If not checked, ignore remaining fields |
| Field #2 (104.2): Type of structure | Checkbox |
| Field #2: Optional | Yes |
| Field #2: Span pages | No |
| Field #2: Location | Detect automatically |
| Field #2: Validation rules | If field #1 (104.1) not checked, ignore. If any of fields #3, #4, or #5 (104.2) checked, raise exception |
| Field #6 (104.3): Type of structure | Text entry |
| Field #6: Optional | Not if field #1 checked |
| Field #6: Span pages | No |
| Field #6: Location | Rightmost field in group |
| Field #6: Validation rules | Compare against predefined list of currency codes, if no match, raise exception |

The invention claimed is:

1. A method of capturing data from a document image, the method comprising:

processing the document image to identify at least one repetitive structure and its structure properties; and performing a capturing operation including creating a plurality of instances of the repetitive structure based on once-described structure properties of the repetitive structure, and populating each instance with corresponding data from the document image.

2. The method of claim 1, wherein performing the capturing operation comprises validating the data for each instance of the repetitive structure in accordance with the once-described structure properties.

3. The method of claim 1, wherein performing the capturing operation comprises verifying the data for each instance of the repetitive structure in accordance with the once-described structure properties.

4. The method of claim 1, wherein performing the capturing operation comprises exporting the data for each instance of the repetitive structure in accordance with the once-described structure properties.

5. The method of claim 1, wherein processing the document image to identify at least one repetitive structure comprises using placement data stored in the document template to identify the or each repetitive structure.

6. The method of claim 1, wherein processing the document image to identify at least one repetitive structure comprises automatically identifying each repetitive structure.

7. The method of claim 1, which further comprises selecting the document template from a plurality of pre-defined document templates.

8. A method of creating a document template for capturing data from a document image, the method comprising:

identifying at least one repetitive structure to be encountered in the document image from which data is to be captured; and storing structure properties as the document template to process the repetitive structure in the document image, wherein the structure properties are described once in the document template, regardless of a number of occurrences of the repetitive structure in the document image.

9. The method of claim 8, wherein the structure properties consist of at least one of validation, verification, and export procedures to be followed when capturing data from the or each repetitive structure in the document image.

10. The method of claim 8, wherein the structure properties comprise attributes of the or each repetitive structure.

11. The method of claim 8, wherein the attributes are selected from the group consisting of an indication of whether or not a particular field within a repetitive structure is optional, an indication of whether or not a particular repetitive structure spans multiple pages in the image document, rules which connect the contents of a particular field to the contents of another field, rules which connect the contents of a particular field to other available data, an expected number of fields, and an expected range of numbers of fields.

12. The method of claim 8, which further comprises storing placement data for the or each repetitive structure in the document template.

13. The method of claim 8, wherein the repetitive structure is a field.

14. The method of claim 8, wherein the repetitive structure is a group of fields.

15. A non-transitory computer-readable medium embodying a set of instructions which, when executed by a computer, cause the computer to:

process a document image to identify at least one repetitive structure; and perform a capturing operation including creating a plurality of instances of the repetitive structure based on once-described structure properties of the repetitive structure in a document template, and populating each instance with corresponding data from the document image.

16. A non-transitory computer-readable medium embodying a set of instructions which, when executed by a computer, cause the computer to:
   identify at least one repetitive structure to be encountered in a document image from which data is to be captured; and
   store structure properties to process the repetitive structure in the document image, wherein the structure properties are described once in a document template, regardless of a number of occurrences of the repetitive structure in the document image.

17. A system for capturing data from a document image, the system comprising:
   an imaging component capable of capturing the document image of a document;
   a processor; and
   a memory coupled to the processor and in electronic communication with the imaging component, the memory configured with instructions for causing the processor to:
      process the document image to identify at least one repetitive structure; and
      perform a capturing operation including creating a plurality of instances of the repetitive structure based on once-described structure properties of the repetitive structure, and populating each instance of the repetitive structure with corresponding data from the document image.

18. The system of claim 17, which is operable, when performing the capturing operation, to validate the data for each instance of the repetitive structure in accordance with the once-described structure properties.

19. The system of claim 17, which is operable, when performing the capturing operation, to verify the data for each instance of the repetitive structure in accordance with the once-described structure properties.

20. A system for creating a document template for capturing data from a document image, the system comprising:
   an imaging component capable of capturing the document image of a document;
   a processor; and
   a memory coupled to the processor and in electronic communication with the imaging component, the memory configured with instructions for causing the processor to:
      identify at least one repetitive structure to be encountered in the document image from which data is to be captured; and
      store structure properties as the document template to process instances of the repetitive structure in the document image, wherein the structure properties are described once in the document template, regardless of a number of occurrences of the repetitive structure in the document image.

21. The system of claim 17, wherein the imaging component is an external input device.

22. The system of claim 17, wherein the instructions further cause the imaging component to capture the document image of the document.

23. The system of claim 20, wherein the imaging component is an external input device.

24. The system of claim 20, wherein the instructions further cause the imaging component to capture the document image of the document.

* * * * *